US006962255B2

(12) United States Patent
Tse

(10) Patent No.: US 6,962,255 B2
(45) Date of Patent: Nov. 8, 2005

(54) APPARATUS AND METHOD OF SEPARATING MEDIUM-SIZED MATERIALS FROM GARBAGE FOR COLLECTION

(75) Inventor: Steven Tse, Room G08,Block 7,Kang Yuan,Guangzhou Country Garden, Dashi, Panyu, Guangzhou City, Guangdong, 511430 (CN)

(73) Assignee: Steven Tse, Guangzhou (CN)

( * ) Notice: Subject to any disclaimer, the term of this patent is extended or adjusted under 35 U.S.C. 154(b) by 141 days.

(21) Appl. No.: 10/436,110

(22) Filed: May 13, 2003

(65) Prior Publication Data

US 2004/0226865 A1 Nov. 18, 2004

(51) Int. Cl.$^7$ .............................................. B07C 5/12
(52) U.S. Cl. ...................... 209/685; 209/930; 209/688; 209/681; 209/659; 209/156
(58) Field of Search ................................. 209/644, 665, 209/930, 707, 234

(56) References Cited

U.S. PATENT DOCUMENTS

| | | | | |
|---|---|---|---|---|
| 3,042,198 A | * | 7/1962 | Slavich ........................ 209/86 |
| 3,568,839 A | * | 3/1971 | Dunlea, Jr. .................. 210/152 |
| 3,650,396 A | * | 3/1972 | Gillespie et al. ............... 209/3 |
| 3,666,091 A | * | 5/1972 | Ludium ......................... 209/2 |
| 3,720,380 A | * | 3/1973 | Marsh .......................... 241/20 |
| 3,802,631 A | * | 4/1974 | Boyd ........................... 241/20 |
| 3,888,351 A | * | 6/1975 | Wilson ......................... 209/75 |
| 4,078,683 A | * | 3/1978 | Hansen, Jr. ................. 214/310 |
| 5,465,847 A | * | 11/1995 | Gilmore .................... 209/12.1 |
| 5,902,976 A | * | 5/1999 | Beasley ....................... 209/164 |

* cited by examiner

*Primary Examiner*—Donald P. Walsh
*Assistant Examiner*—Jonathan R Miller
(74) *Attorney, Agent, or Firm*—Ware, Fressola, Van Der Sluys & Adolphson LLP

(57) ABSTRACT

An apparatus and method of separating medium-sized materials such as trash, bottles, floated articles, and submerged articles from garbage for collection by means of wind and water is disclosed. Moreover, an initial cleaning of garbage and a dilution of toxic materials contained therein are performed while disposing garbage, thereby significantly reducing a possibility of contracting diseases by or poisoning cleaning employees.

6 Claims, 5 Drawing Sheets

STEP 1:

POUR GARBAGE MIXED WITH WATER INTO A CONVEYOR SCREEN ASSEMBLY PRIOR TO SEPARATE MEDIUM-SIZED GARBAGE THEREFROM

STEP 2:

SEPARATE HEAVY GARBAGE AND LIGHT GARBAGE FROM THE MEDIUM-SIZED GARBAGE BY BLOWING

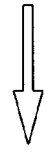

STEP 3:

SEPARATE EMPTY CANS AND BOTTLES FROM THE LIGHT GARBAGE BY BLOWING

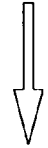

STEP 4:

SEPARATE FLOATED AND SUBMERGED ARTICLES FROM THE REMAINED GARBAGE BY WATER FLOW

FIG. 1

APPARATUS AND METHOD OF SEPARATING MEDIUM-SIZED MATERIALS FROM GARBAGE FOR COLLECTION

BACKGROUND OF THE INVENTION

1. Field of the Invention

The present invention relates to garbage disposal and more particularly to an apparatus and method of rapidly, effectively of separating medium-sized materials (e.g., thin plastic plates, etc.) from garbage for collection.

2. Description of Related Art

As to garbage disposal, typically there are techniques, i.e., landfill and burning, widely used throughout the world. Many precious lands are used for landfill as more garbage is generated everyday. Underground water and soil may be polluted by buried garbage if an appropriate disposal is not done. As to burning, it can cause severe air pollution if smoke generated during burning is not well processed prior to discharge. As to generated ashes, they are buried after being generated. Hence, the problem of polluting underground water and soil still exists. Further, it is often that residents violently protest a garbage disposal site to be established in their neighborhood because they think it may degrade their living quality once established. Furthermore, the cost of disposing garbage is increased significantly as less land being available for landfill.

Resources on earth begin to deplete in recent years. Hence, more and more people are aware of the importance of resource recycling by actively cooperating with the resource recycling policy. It is desired that amount of garbage can be reduced significantly in a near future by successfully recycling resources in order to prolong a useful time of land for burying garbage and preserve limited resources on earth.

However, the typical resource recycling (i.e., garbage recycling) techniques are unsatisfactory now. For example, a satisfactory garbage classification is not possible by the typical resource recycling techniques mainly because a wide variety of different materials are contained in garbage. The materials comprise cotton products, cans made of aluminum or iron, plastic plates, plastic foam products, etc. More often that classification of such garbage is done by a disadvantageous manual process for being time consuming and tedious. Moreover, cleaning employees are susceptible of contracting diseases or being poisoned by contaminants or toxic materials contained in some cotton products or bottles mixed with garbage. Hence, a need for improvement exists.

Thus, it is desirable to provide a novel apparatus and method of separating medium-sized materials such as thin plastic plates or the like from garbage for collection in order to overcome the above drawbacks of the prior art.

SUMMARY OF THE INVENTION

It is an object of the present invention to provide an apparatus and method of effectively separating medium-sized materials from garbage for collection by means of wind and water.

It is another object of the present invention to provide an apparatus and method of separating medium-sized materials such as trash, bottles, floated articles, and submerged articles from garbage for collection.

It is yet another object of the present invention to provide a method of separating medium-sized materials from garbage for collection while performing an initial cleaning of garbage and a dilution of toxic materials in garbage by water for preventing the toxic materials from leaking, thereby significantly reducing a possibility of contracting diseases by or poisoning cleaning employees.

To attain the above mentioned objects and advantages, the method of the invention comprising the steps of:

(1) pouring garbage mixed with water into a conveyor screen assembly prior to separating a medium-sized garbage therefrom;

(2) separating heavy garbage and light garbage from the medium-sized garbage by blowing;

(3) separating empty cans and bottles from the light garbage by blowing; and (4) separating floated and submerged articles from the remained garbage in the step (3) by water flow by discharging the light garbage from a inclined conveyor into a water channel and separating the floated and the submerged articles from the light garbage by water flow in the water channel for respectively collecting.

Preferably, the step (1) of the invention comprises the sub-steps of:

pouring the garbage mixed with water into the conveyor screen assembly to cause small garbage and organic matter to pass through the conveyor screen assembly for collection; and blowing the not sifted medium-sized garbage out of a surface of the conveyor screen assembly for further processing by strong wind set up by a blower.

Preferably, the step (2) of the invention comprises the sub-steps of:

activating blowing means to blow air into a wind channel for forcing the medium-sized garbage to fall onto an inclined conveyor; and continuing to transport the lighter garbage and the empty cans and bottles along the inclined conveyor and dropping the heavy garbage out of the inclined conveyor for collection.

Preferably, the step (3) of the invention comprises the sub-steps of:

blowing wind toward the cans, the bottles, and the lighter garbage on the inclined conveyor for continuing to carry the lighter garbage upward along the inclined conveyor; and dropping the empty cans and bottles out of the inclined conveyor for collection wherein the empty cans and bottles substantially have a round shape or being multiangular and have a sufficient weight.

Preferably, the apparatus of invention comprising:

a conveyor screen assembly for permitting small, light garbage and organic matter in the garbage to pass through, the conveyor screen assembly comprising an internal blower proximate one end, the blower being adapted to obliquely blow air toward a surface and one end of the conveyor screen assembly;

a conveyor under one end of the conveyor screen assembly and perpendicular to a lengthwise direction of the conveyor screen assembly, the conveyor being adapted to transport the medium-sized garbage sent from the conveyor screen assembly to a next stage;

a waterway beneath both the conveyor screen assembly and the conveyor;

a baffle above the conveyor and in front of one end of the conveyor screen assembly, the baffle being adapted to deflect the medium-sized garbage blown from the conveyor screen assembly onto the conveyor;

a wind channel for receiving a discharge end of the conveyor, the wind channel including a first blowing means under the conveyor for blowing air into the wind channel;

a trash conveyor under and perpendicular to a lengthwise direction of the first blowing means, one end of the trash conveyor being horizontally extended away from the wind channel;

a trash collection container under a discharge end of the trash conveyor;

a gable wind shroud coupled to a discharge opening of the wind channel at its intake end, the wind shroud comprising a second blowing means at the intake end of the wind shroud, the second blowing means being adapted to blow air into the wind channel, the second blowing means being higher than the first blowing means, an internal inclined conveyor at a path of blowing air of the second blowing means, an angle of the inclined conveyor being adjustable and a top of the inclined conveyor being spaced apart from a bottom of a vertex of the wind shroud for permitting a free garbage pass therebetween, a bottle conveyor below the inclined conveyor, and a bottle collection tray below a discharge end of the bottle conveyor; and a water channel below a discharge opening of the wind shroud opposite the wind channel, the water channel comprising a drain pipe extended from a bottom thereof, an inclined submerged article conveyor above the drain pipe, a submerged article collection container below a discharge end of the submerged article conveyor, a top recess at a side wall of the water channel, an inclined sprinkler including a plurality of injection nozzles for obliquely spraying water toward a surface of the water channel and the recess, and a collection vessel below and adjacent the recess for storing water and floated articles.

The above and other objects, features and advantages of the present invention will become apparent from the following detailed description taken with the accompanying drawings.

BRIEF DESCRIPTION OF THE DRAWINGS

FIG. 1 is a flow chart showing a sequence of method steps performed by an apparatus according to the invention;

DETAILED DESCRIPTION OF THE PREFERRED EMBODIMENTS

Medium-sized garbage of the invention is defined as thin plastic plates, floated articles (e.g., bottles, food containers made of plastic foam, and leaves), or submerged articles (e.g., shoes, boards, detachable products, and diapers). For ease of discussion, they are collectively called medium-sized garbage.

First mix garbage with water. Next, remove heavy or large garbage (i.e., garbage sunk in water) from garbage. A sequence of method steps are then performed by an apparatus of separating medium-sized materials from garbage for collection in accordance with the invention as referring to FIG. 1.

In step 1, pour garbage mixed with water into a conveyor screen assembly prior to separating medium-sized garbage therefrom. In detail, pour garbage mixed with water into a conveyor screen assembly to cause small garbage and organic matter to pass through meshed openings of the conveyor screen assembly for collection. The not sifted medium-sized garbage will be blown out of the conveyor screen assembly for further processing by strong wind set up by a blower.

In step 2, separate heavy garbage and light garbage from the medium-sized garbage by blowing. In detail, activate a blowing device to blow air into a wind channel for forcing the medium-sized garbage to fall onto an inclined conveyor in which light garbage, cans, or bottles will continue to carry along the inclined conveyor and heavy garbage will be dropped out of the inclined conveyor for collection.

In step 3, separate empty cans and bottles from the light garbage by blowing. In detail, blow a strong wind toward cans, bottles, and light garbage on the inclined conveyor in which the light garbage will continue to be carried upward along the inclined conveyor by the strong wind blown thereonto and empty cans and bottles substantially having a round shape or being multiangular and having a sufficient weight, they will drop out of the inclined conveyor for collection.

In step 4, separate floated and submerged articles from the remained garbage by water flow. In detail, light garbage discharged from the inclined conveyor will drop into a water channel. Next, separate floated and submerged articles from the light garbage by water flow in the water channel for respectively collecting.

Figure 2:
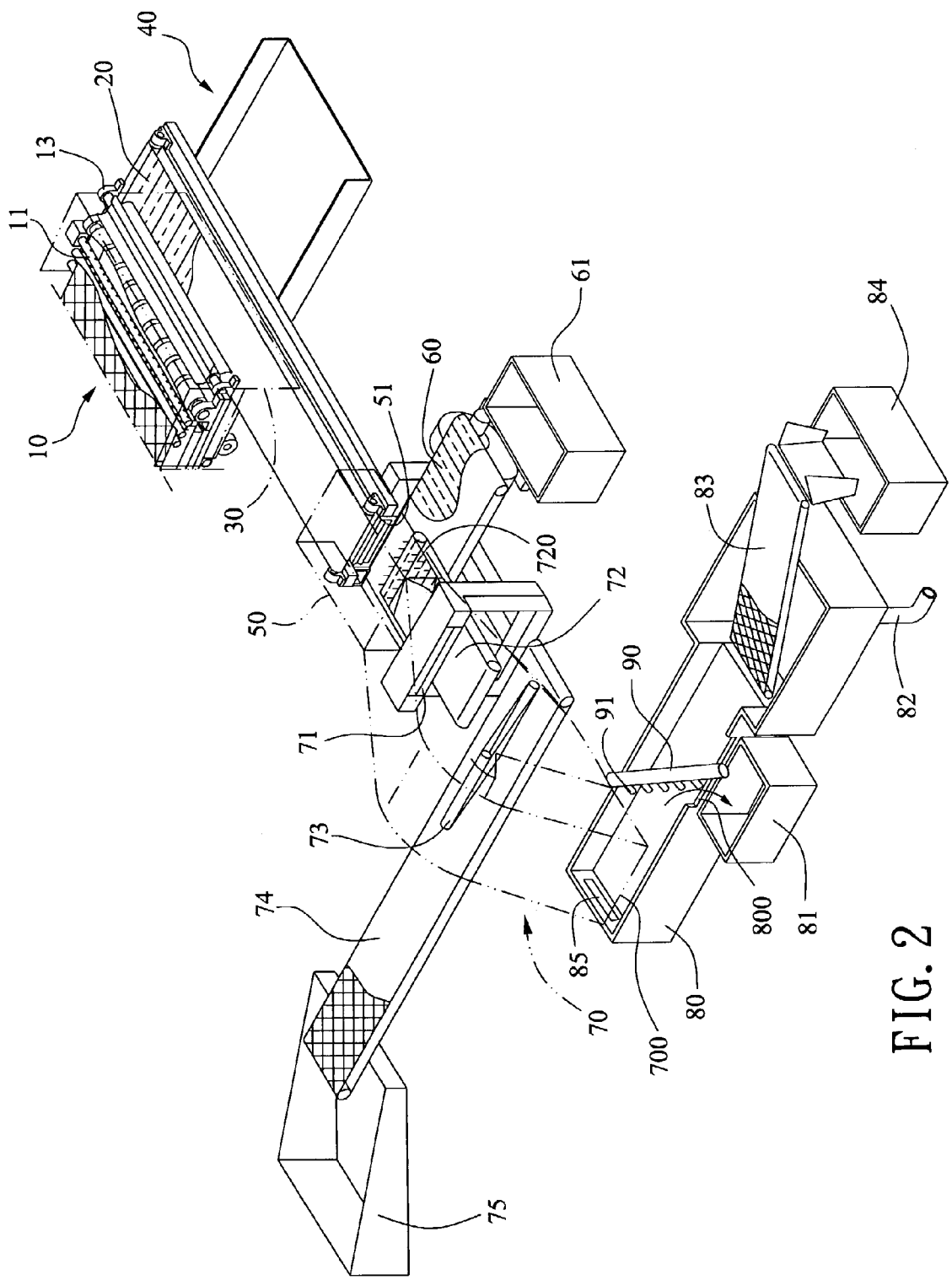
FIG. 2 is a perspective view of a preferred embodiment of the apparatus.
Figure 3:
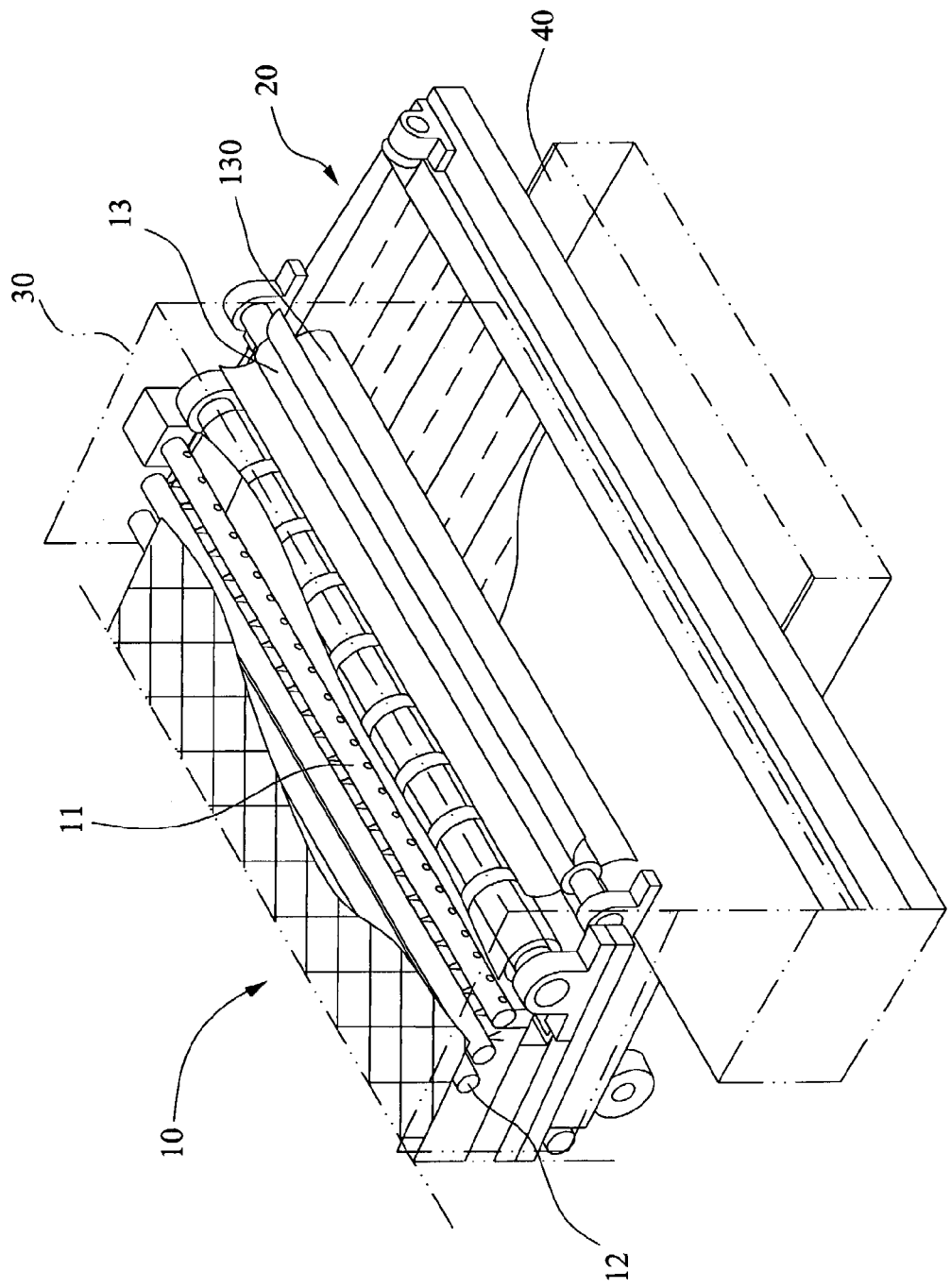
FIG. 3 is an enlarged view of a portion of FIG. 3.
Figure 4:
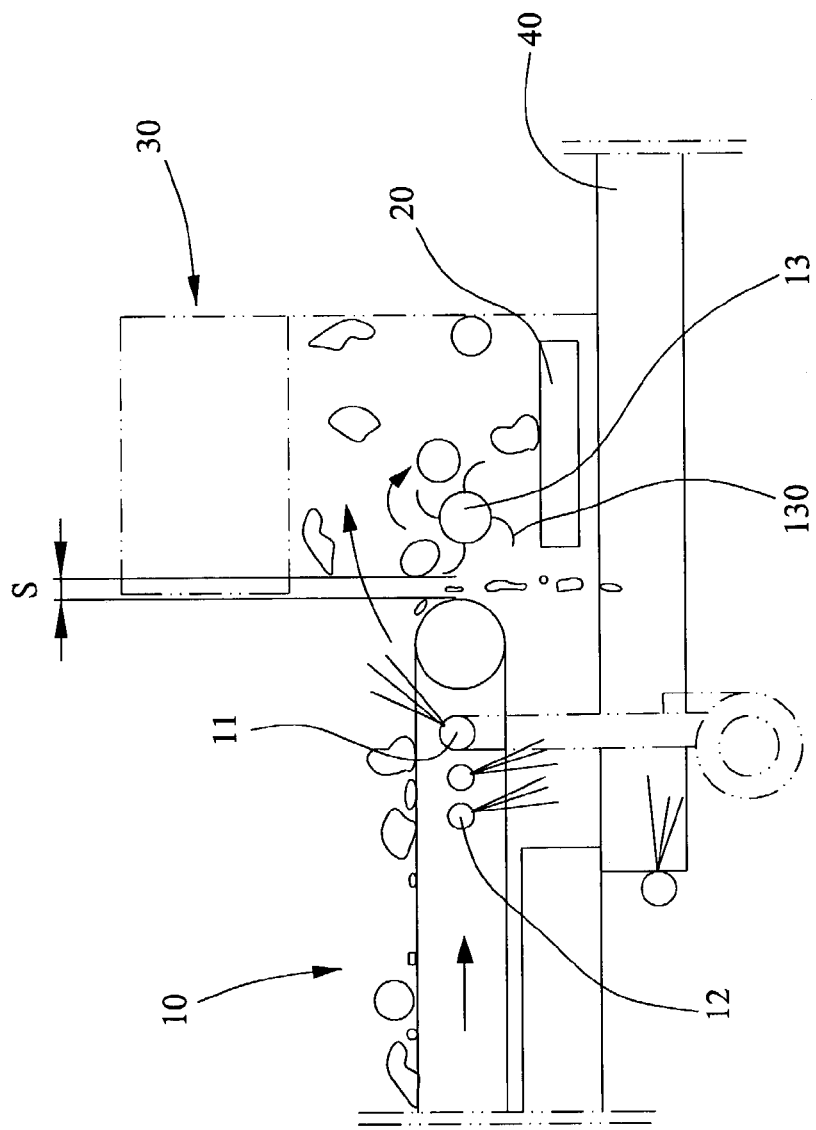
FIG. 4 is a side view of FIG. 3 schematically illustrating a portion of garbage disposal flow performed by the apparatus.
Figure 5:
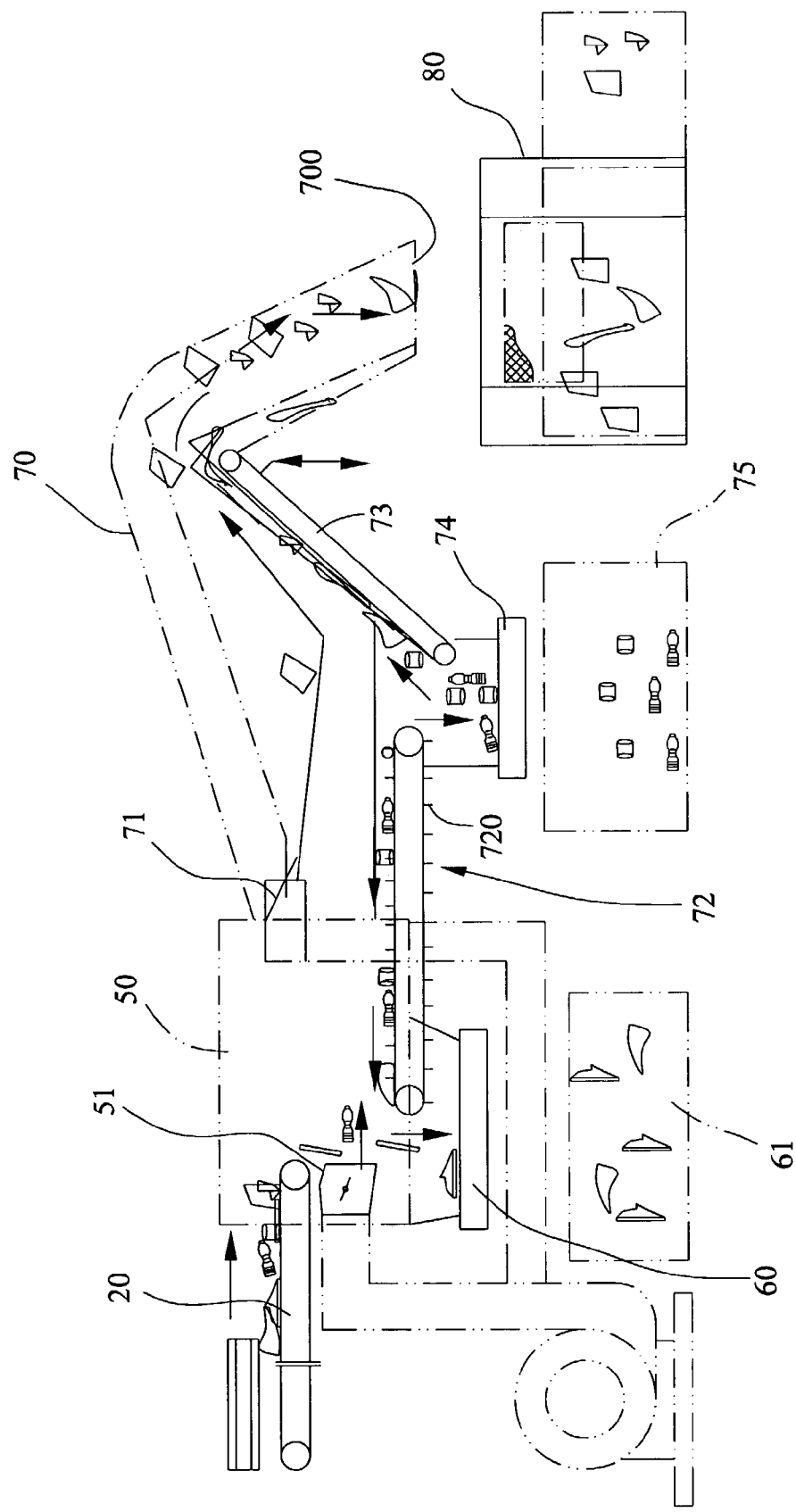
FIG. 5 is a side view schematically illustrating the garbage disposal flow performed by the apparatus.

Referring to FIGS. 2, 3, 4, and 5, the apparatus of separating medium-sized materials from garbage for collection is shown. The apparatus comprises a conveyor screen assembly 10 for permitting small, light garbage and organic matter in garbage to pass through. The conveyor screen assembly 10 comprises an internal blower 11 proximate one end of the conveyor screen assembly 10, the blower 11 being adapted to obliquely blow air toward a surface and one end of the conveyor screen assembly 10, and an internal sprinkler assembly 12 for upwardly spraying water toward the conveyor screen assembly 10. The apparatus further comprises a first conveyor 20 under one end of the conveyor screen assembly 10 and perpendicular to a lengthwise direction of the conveyor screen assembly 10, the first conveyor 20 being adapted to transport medium-sized garbage sent from the conveyor screen assembly 10 to a next stage as detailed later, a waterway 40 beneath both the conveyor screen assembly 10 and the first conveyor 20, a baffle 30 above the first conveyor 20 and in front of one end of the conveyor screen assembly 10, the baffle 30 being adapted to deflect the medium-sized garbage blown from the conveyor screen assembly 10 onto the first conveyor 20, and a shaft 13 including a plurality of equally spaced apart, arcuate, and axial revolving vanes 130 on its outer surface. The shaft 13 can rotate clockwise (see FIG. 4). A gap S of about 3 cm to about 10 cm is formed between one end of the conveyor screen assembly 10 and the outermost point of the vane 130. Also, the gap S is adjustable.

The apparatus further comprises a wind channel 50 for receiving the other end of the first conveyor 20, the wind channel 50 including a first blowing device 51 under the first conveyor 20 for blowing air into the wind channel 50, a trash conveyor 60 under and perpendicular to a lengthwise direction of the first blowing device 51, one end of the trash conveyor 60 being horizontally extended away from the side of the wind channel 50, a trash collection container 61 under one end of the trash conveyor 60, a gable wind duct 70 having one end coupled to a discharge opening of the wind channel 50, the wind duct 70 comprising a second blowing device 71 at the junction of the wind duct 70 and the wind channel 50, the second blowing device 71 being adapted to blow air into the wind channel 50, the second blowing device 71 being higher than the first blowing device 51, a reverse conveyor 72 under the second blowing device 71 but above the trash conveyor 60, the reverse conveyor 72 including a plurality of rows of needles 720 made of nylon on an endless transfer belt thereof, an internal inclined second conveyor 73 adjacent the reverse conveyor 72, an inclined angle of the second conveyor 73 being adjustable, the top of the second conveyor 73 being spaced apart from the bottom of a vertex of the wind duct 70 for permitting garbage to pass therebetween, a bottle conveyor 74 below and between the second conveyor 73 and the reverse conveyor 72, and a bottle collection tray 75 below a discharge end of the bottle conveyor 74.

The apparatus further comprises a water channel 80 below a discharge opening 700 of the wind duct 70 opposite the wind channel 50, the water channel 80 comprising a drain pipe 82 extended from its bottom, an inclined submerged article conveyor 83 above the drain pipe 82, a submerged article collection container 84 below a discharge end of the submerged article conveyor 83, a top recess 800 at a side wall of the water channel 80, an inclined sprinkler 90 having a plurality of injection nozzles 91 for obliquely spraying water toward a surface of the water channel 80 and the recess 800, and a collection vessel 81 below and adjacent the recess 800 for storing water and floated articles including products made of plastic foam.

An operation of the invention will now be described below by referring to FIGS. 2 to 5 again. First mix garbage with water. Next, remove heavy or large garbage (i.e., garbage sunk in water) from garbage. Next, pour garbage mixed with water into the conveyor screen assembly 10. Small garbage will pass through meshed openings of the conveyor screen assembly 10 to fall onto the waterway 40 under the conveyor screen assembly 10. Water in the waterway 40 will transport the small garbage to a next stage for processing which is not pertinent to the invention. Thus a detailed description thereof is omitted herein for the sake of brevity. The garbage not sifted is continuously transported toward the first conveyor 20 and medium-sized, light materials in garbage are immediately blown out of the surface of the conveyor screen assembly 10 by strong wind set up by the blower 11. The blown medium-sized garbage is blocked and deflected by the baffle 30 to fall onto the first conveyor 20. The medium-sized garbage (e.g., containers full of water or bottles full of water) having a size larger than the gap S between one end of the conveyor screen assembly 10 and the outermost point of the vane 130 will contact the vanes 130. The revolving vanes 130 then convey them to fall onto the first conveyor 20. As to garbage having a size less than the gap S will drop into the waterway 40 to be carried away for further processing.

For the medium-sized garbage fallen on the first conveyor 20, it will be transported into the wind channel 50 to fall onto the trash conveyor 60. At this time, the first blowing device 51 is activated to blow air into the wind channel 50. As such, in the wind channel 50 medium-sized, light materials in garbage (e.g., articles made of plastic foam, empty bottles, etc.) carried from the first conveyor 20 will be blown to fall onto the second conveyor 73 by passing over the trash conveyor 60 and the reverse conveyor 72. The activated second conveyor 73 will carry the medium-sized garbage upwardly. For medium-sized garbage having a sufficient weight, it will fall onto the trash conveyor 60 because the blowing strength set up by the first blowing device 51 has a limit. Garbage fallen on the trash conveyor 60 will be carried to the trash collection container 61 for further processing. Note that some materials in the medium-sized garbage (e.g., ropes soaked with water, diapers, or half full bottles and cans, etc.) may have a weight sufficient to be blown up by the first blowing device 51 but they cannot pass over the reverse conveyor 72. The invention takes them as trash in processing. Hence, a transporting direction of the reverse conveyor 72 is toward the trash conveyor 60. In other words, those materials in the medium-sized garbage will be carried by the reverse conveyor 72 to fall onto the trash conveyor 60 for processing. The provision of the rows of needles 720 on the trash conveyor 60 aims at catching the above ropes, diapers, etc. For preventing them from being blown out of the reverse conveyor 72 again by the current of air blown by the first blowing device 51 if they have dried during transporting.

As to light garbage fallen onto the second conveyor 73 as blown by the first blowing device 51, it may be either empty bottles, cans, etc. or articles made of plastic foam, plastic plates, papers, etc. For example, empty bottles or cans substantially have a round shape or being multiangular and have a sufficient weight. Further, they are distal from the first blowing device 51. As a result, they will slide down along the second conveyor 73 to fall onto the bottle conveyor 74 as they are conveying upward along the second conveyor 73. The empty bottles or cans fallen on the bottle conveyor 74 will be carried to drop into the bottle conveyor 74 for further processing. As to articles made of plastic foam, plastic plates, papers, etc., they will be continuously carried by the second conveyor 73 until a predetermined height has been reached. That is, at the predetermined height the current of air blown by the first blowing device 51 does not have a sufficient strength to maintain they to stay on the bottle conveyor 74. Also, about at the predetermined height the second blowing device 71 will blow air toward these articles made of plastic foam, plastic plates, papers, etc. To cause them to still stay on the bottle conveyor 74 for carrying. Moreover, strong air set up by the second blowing device 71 will blow articles made of plastic foam, plastic plates, papers, etc. To fall into the water channel 80 from the discharge opening 700 of the wind duct 70 after passing the wind duct 70. As to articles made of plastic foam, plastic plates, papers, etc. fallen into the water channel 80, they will be carried toward the sprinkler 90 and the submerged article conveyor 83 by water flow. At this time, articles made of plastic foam, etc. will float on the water channel 80. As such, the strong water sprayed by the injection nozzles 91 of the sprinkler 90 will push the floated articles made of plastic foam, etc. To drop into the collection vessel 81 for further processing after leaving the recess 800. As to those plastic plates, papers, etc. (i.e., submerged article), they will continue to carry toward the submerged article conveyor 83 by water flow. The submerged article conveyor 83 will carry the arrived plastic plates, papers, etc. to its end prior to dropping them into the submerged article collection container 84 for further processing.

The benefits of the invention include (1) providing a novel and unique garbage disposal implementation of rapidly, effectively, conveniently, and precisely separating medium-sized garbage from garbage for collection by means of wind and water; (2) performing an initial cleaning of garbage by means of water while classifying garbage for facilitating a subsequent garbage recycling; (3) diluting toxic materials in garbage by means of water while classifying garbage for reducing a possibility of contracting diseases by people; and (4) providing an apparatus capable of effectively, rapidly, and precisely separating medium-sized garbage from garbage for collection.

While the invention herein disclosed has been described by means of specific embodiments, numerous modifications and variations could be made thereto by those skilled in the art without departing from the scope and spirit of the invention set forth in the claims.

What is claimed is:

1. An apparatus of separating medium-sized materials from garbage for collection comprising:
   a conveyor screen assembly for permitting small, light garbage and organic matter in the garbage to pass through, the conveyor screen assembly comprising an internal blower proximate one end, the blower being adapted to obliquely blow air toward a surface and one end of the conveyor screen assembly;
   a conveyor under one end of the conveyor screen assembly and perpendicular to a lengthwise direction of the conveyor screen assembly, the conveyor being adapted to transport the medium-sized garbage sent from the conveyor screen assembly to a next stage;
   a waterway beneath both the conveyor screen assembly and the conveyor;
   a baffle above the conveyor and in front of one end of the conveyor screen assembly, the baffle being adapted to deflect the medium-sized garbage blown from the conveyor screen assembly onto the conveyor;
   a wind channel for receiving a discharge end of the conveyor, the wind channel including a first blowing means under the conveyor for blowing air into the wind channel;
   a trash conveyor under and perpendicular to a lengthwise direction of the first blowing means, one end of the trash conveyor being horizontally extended away from the wind channel;
   a trash collection container under a discharge end of the trash conveyor;
   a gable wind duct coupled to a discharge opening of the wind channel at its intake end, the wind duct comprising a second blowing means at the intake end of the wind duct the second blowing means being adapted to blow air into the wind channel, the second blowing means being higher than the first blowing means, an internal inclined conveyor at a path of blowing air of the second blowing means, an angle of the inclined conveyor being adjustable and a top of the inclined conveyor being spaced apart from a bottom of a vertex of the wind duct for permitting a free garbage pass therebetween, a bottle conveyor below the inclined conveyor, and a bottle collection tray below a discharge end of the bottle conveyor; and
   a water channel below a discharge opening of the wind duct opposite the wind channel, the water channel comprising a drain pipe extended from a bottom thereof, an inclined submerged article conveyor above the drain pipe, a submerged article collection container below a discharge end of the submerged article conveyor, a top recess at a side wall of the water channel, an inclined sprinkler including a plurality of injection nozzles for obliquely spraying water toward a surface of the water channel and the recess, and a collection vessel below and adjacent the recess for storing water and floated articles.

2. The apparatus of claim 1, wherein the conveyor screen assembly further comprises an internal sprinkler assembly for upwardly spraying water toward the conveyor screen assembly.

3. The apparatus of claim 1, wherein the conveyor screen assembly further comprises a shaft outside one end of the conveyor screen assembly, the shaft including a plurality of equally spaced apart, arcuate, and axial revolving vanes on its outer surface and the shaft is spaced apart from the one end of the conveyor screen assembly by a distance.

4. The apparatus of claim 1, wherein the wind shroud further comprises a reverse conveyor under the second blowing means and above the trash conveyor.

5. The apparatus of claim 4, wherein the reverse conveyor comprises a plurality of rows of needles on an endless transfer belt thereof.

6. The apparatus of claim 5, wherein the needle is formed of nylon.

* * * * *